United States Patent [19]

Dirks

[11] 4,237,951
[45] Dec. 9, 1980

[54] INDUSTRIAL TIRE CHAIN TIGHTENER

[76] Inventor: Jay Dirks, Box 1039, Bonners Ferry, Id. 83805

[21] Appl. No.: 31,499

[22] Filed: Apr. 19, 1979

[51] Int. Cl.³ .............................................. B60C 27/00
[52] U.S. Cl. ................................. 152/242; 24/68 TT; 24/70 TT; 24/73 AC; 24/73 CE; 24/116 R; 59/86; 59/93; 152/241; 254/234; 403/44
[58] Field of Search ............... 152/241, 242, 233, 216, 152/213 R, 213 A, 172, 179, 184, 191, 189, 208, 218; 59/93, 86; 301/42; 403/43–48, 296; 24/68 CT, 68 TT, 70 CT, 70 TT, 116 R, 73 AC, 73 CE; 254/67

[56] References Cited

U.S. PATENT DOCUMENTS

| 795,767 | 7/1905 | Hershberger | 152/242 |
| 2,872,224 | 2/1959 | Osborne | 403/44 |
| 3,073,369 | 1/1963 | Jones | 152/241 X |
| 3,108,783 | 10/1963 | Foust et al. | 254/67 |

Primary Examiner—William A. Powell
Assistant Examiner—Thomas Bokan
Attorney, Agent, or Firm—Wells, St. John & Roberts

[57] ABSTRACT

A tightener for securing tire chains about industrial tires. The tightener includes a pair of block members that are threadably engaged by a draw bolt. The draw bolt includes a tool engaging surface that facilitates attachment of a tool to turn the draw bolt about its central axis and correspondingly move the block members axially toward or away from one another. A pair of non-extensible lengths of chain are connected to each block and extend outwardly to free ends that are adapted for connection to the side rail chain of an industrial tire chain. Therefore, the tightener may be mounted with the length of chain connected to the side rail chain and the blocks and draw bolt substantially centered on the tire axis. The draw bolt may then be rotated to bring the block members axially together, pulling inwardly on the side rail chains to tighten the tire chain about the tire periphery.

5 Claims, 4 Drawing Figures

U.S. Patent
Dec. 9, 1980
4,237,951
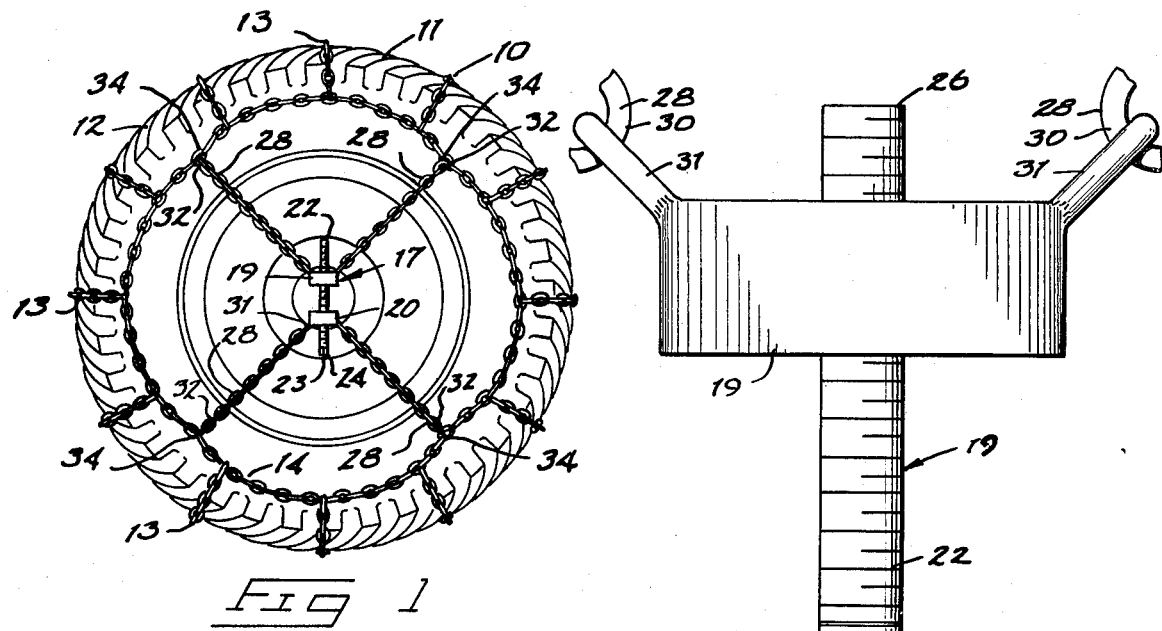
Fig 1
Fig 2
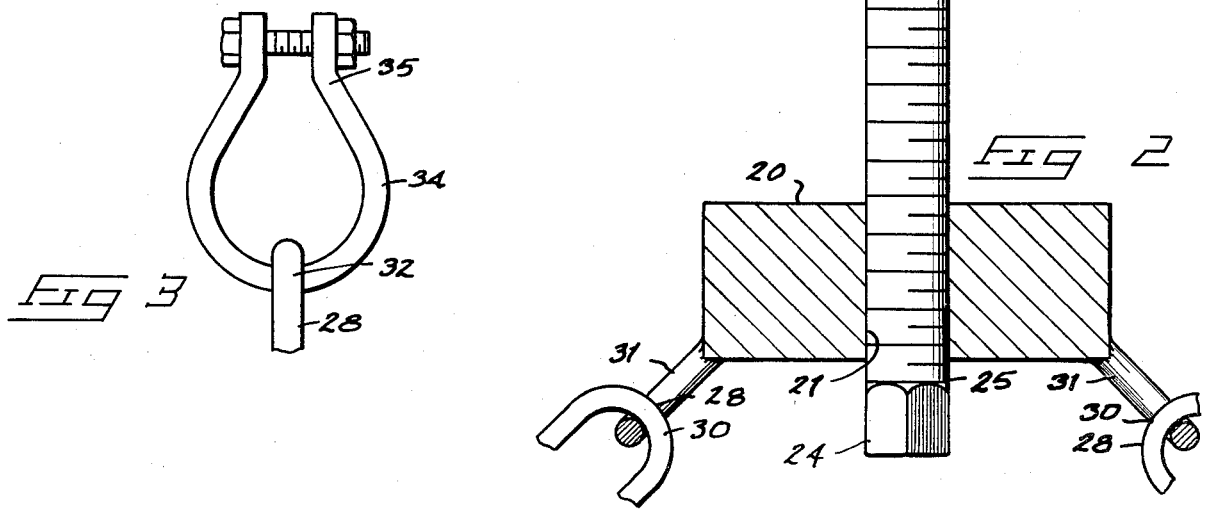
Fig 3
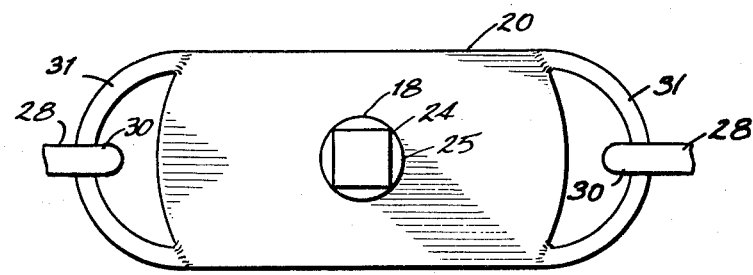
Fig 4

INDUSTRIAL TIRE CHAIN TIGHTENER

BACKGROUND OF THE INVENTION

The present invention is related to a device for tightening heavy duty, industrial type tire chains mounted on industrial tires.

Vehicles with pneumatic tires are being increasingly used in applications where metal tracks were previously used. Rubber tired log skidders are now in use in the forest industry where track type skidders were previously used. Rubber tired vehicles are more maneuverable than tracked vehicles and rubber tires do not cause as extensive environmental damage as do metal tracks. Other industries such as agriculture and construction have also adopted increased usage of large industrial rubber tired vehicles.

One difficulty in using such large scale tires is inadequate traction due to the reduced area of tire-to-ground contact in comparison with track vehicles. In many cases it is desirable to make use of tire chains to increase traction by providing additional "bite" against the ground surface. Such chains have proved to be effective in affording additional traction to vehicles using large scale industrial tires. However, a problem remains in maintaining the chains in position on the tires.

Large industrial tire chains and tires are extremely costly. It is very desirable to maintain the chains in proper position in order to reduce wear on both the chains and tires. This is difficult since industrial tires typically include large protruding rubber tread lugs which interfere with full contact between the chain and tire surfaces. A chain may be initially mounted in a tight, secure condition, but will work loose soon after use. A loose chain will rub against the tire surface, the ground surface and itself; and will prematurely wear. Such unnecessary wear substantially reduces the useful life of the chain and might cause tire damage as well.

The typical conventional tire chain tightener has a resilient member that is connected between diametrically opposed points on the chain side rails. Presently known forms of tire chain tighteners cannot be used effectively on large scale industrial tire chains due to inadequate resilient tightening members usually provided with such units. The resilient members will operate effectively to securely hold tire chains in place on the conventional transportation vehicle tires. However, they will not function adequately at all with large scale industrial tires. The tensioning forces produced by resilient members cannot be made substantial enough to allow installation by hand. Furthermore, the resilient members are easily cut and broken during use where the chain side rails and tighteners are continuously exposed to engagement against rocks and other encountered obstacles.

Prior mechanical appliances have been utilized effectively for the smaller transport vehicle tires with varying degrees of success. Such appliances will not operate effectively under the substantial strains produced in use of large scale industrial tires.

The present invention was conceived to effectively and efficiently secure industrial tire chains to large scale industrial tires so the chains will not work loose on the tire, regardless of its lug configuration.

BRIEF DESCRIPTION OF THE DRAWINGS

FIG. 1 is an illustration of an industrial tire and chain showing the present tightener mounted thereon;

FIG. 2 is a partially sectioned view of the present tightener;

FIG. 3 is a fragmentary detail view of an appropriate fastener for connecting the ends of the several links to the side rail chain of an industrial tire chain; and FIG. 4 is a bottom plan view of the present tightener as seen from below in FIG. 2.

DETAILED DESCRIPTION OF A PREFERRED EMBODIMENT

An industrial tire chain is indicated at 10 in FIG. 1. The tire chain 10 is mounted to an industrial form of tire 11. The chain includes cross chains 13 that overlap the tire tread 12, extending from one side surface of the tire to the opposite surface. The cross chains 13 are interconnected on opposite sides of the tire by a pair of side rail chains 14, one of which is illustrated in FIG. 1. The opposite side rail chain is situated on the opposite surface of the tire and is not visible in the drawings.

The present chain tightener is illustrated in FIG. 1 and is generally designated therein by the numeral 17. It pulls the side rail chain 14 radially inward toward the central axis of the tire 11. This tensioning action secures the cross chains 13 against the tire tread and prevents radial extension or movement of the cross chains with respect to the tire axis.

The tightening 17 is illustrated in more detail by FIGS. 2, 3 and 4. A central elongated draw bolt 18 is threadably engaged within a first block member 19 and a second block member 20. Each block member 19, 20 includes an open threaded bore 21 extending through it from one side to the other for threadable engagement by the shank of draw bolt 18.

The threaded shank of the draw bolt may be provided with a right hand threaded portion 22 and an axially spaced left hand threaded portion 23. The corresponding threads formed within the respective block members 19 and 20 are provided to cause axial movement of the blocks 19 and 20 toward or away from one another in response to rotation of the draw bolt 18 about its axis.

Rotation of the draw bolt is accomplished through a tool gripping surface 24 provided on draw bolt 18. The surface is polygonal in cross section, adapting the draw bolt to be engaged by a standard form of open end wrench or other appropriate turning tool (not shown). The tool (not shown) preferably has a ratchet action by which bolt 18 can be rapidly turned.

The tool gripping surface 24 is preferably situated at an end 25 of the draw bolt 18. However, it is conceivable that the gripping surface 24 may be provided at any location along the axial length of draw bolt 18 and could even be situated between blocks 19 and 20.

One of the threaded portions 22 or 23 may be considered as means interconnecting the associated block 19 or 20 to the draw bolt for controlling axial movement of the block member along its shank. Other arrangements are also envisioned to accomplish this purpose. For example, the tool gripping surface 24 could be provided as an enlarged bolt head (not shown) having a boss facing the adjacent block to prevent axial movement beyond the gripping surface. Similarly, a headed end (not shown) could also be provided at an opposite end 26 of the draw bolt. It is preferable though, that oppositely turned thread portions 22 and 23 be provided so that rotation of the draw bolt about its axis will cause corresponding axial movement of both block members toward or away from one another.

A minimum of one nonextensible side rail chain connector 28 is provided on each block member 19 or 20. The connectors 28 extend outwardly from the attached blocks to connect as shown in FIG. 1 to the side rail chain 14 of the industrial tire chain. It is preferred that the connectors 28 be provided in the form of flexible chains including chain links similar in composition to the structure of the side rail chains 14. The flexible chains each include an end 30 that is mounted to the associated block member 19 or 20. Each block is provided with an appropriate ear 31 to which the link end 30 is attached.

The flexible chains or connectors 28 extend outwardly to free ends 32. These ends 32 include an appropriate form of shackle means 34 (FIG. 3) allowing attachment of the free ends 32 to the side rail chain 14. The shackle means 34 may comprise a standard form of clevis fastener 35 or may be another form of conventionally available fastener adapted to connect chain links together.

It is preferred that four of the flexible chains or connectors 28 be provided, being attached to each of the blocks 19 and 20. The ears 31 mounting the connectors 28 are situated at diametrically opposed positions with respect to the draw bolt axis to allow the chains to extend substantially radially outward from the center axis of the tire to connection points on the side rail chains. This enables tightening of the chain 10 at equally spaced points about the central axis of the tire.

The present tightener is mounted to a tire chain 10 that has previously been mounted on an industrial tire 12. With the tire chain 10 thus mounted, the side rail chain 14 will be exposed along the vertical outwardly facing surface of the tire to facilitate connection of the connector ends 32 at points equally spaced about the axis of the tire. The upper points are first selected and ends of a first pair of the flexible connectors 28 are secured by the shackle means 34 at the selected positions on the side rail chain 14. The lower pair of connectors 28 may then be attached at points diametrically opposite the attachment points for the first pair of connectors 28.

It is also preferred that connectors 28 be attached so that each is equal in length between the blocks and side rail chain. Where smaller tires are utilized, the shackle means 34 may be connected inwardly of the free connector ends to accommodate the smaller radius of the side rail chain. The equal lengths of connectors 28 will position the blocks 19, 20 and draw bolt 17 at the center of the tires to assure that forces produced in tightening the tire chain will be substantially radial with respect to the tire axis.

The connectors 28 are initially attached to the side rail 14 with as little slack as possible. Subsequent rotation of the draw bolt 17 to move the blocks 19, 20 together will therefore cause immediate corresponding tightening of the connectors 28 and chain 14. This tightens the cross chains 13 about the tread.

The tightener is easily removed from a tire chain by loosening the draw bolt 17 (separating the blocks 19 and 20) to produce slack in the connectors 28. The shackle means 34 may then be disconnected from the side rail chains 14.

The above description and accompanying drawing are given by way of example to set forth a preferred form of the invention. The scope of this invention is defined by the following claims.

What I claim is:

1. An industrial tire chain tightener mountable to the side rail chain of an industrial tire chain for tightening the chain about an industrial tire, comprising:

a first block member having a threaded bore formed through it from one side to the other;

a second block member having a threaded bore formed through it from one side to the other;

a draw bolt having a threaded shank formed about a center axis and having a tool gripping surface thereon, the shank being threadably received within the bores formed through the first and second block member;

non-extensible side rail chain connector means in the form of separate connectors anchored to each of the block members for selectively engaging the side rail chain of an industrial tire chain at points about its periphery with the draw bolt and block members located adjacent the center of an industrial tire on which they are mounted and with the axis of the tire intersecting the axis of the drawbolt;

the threads along the shank of said draw bolt being divided axially into a left hand threaded portion and a right hand threaded portion with the blocks being similarly threaded within their respective bores to threadably receive the right and the left hand threaded portions so that rotational motion of the draw bolt relative to the blocks will cause movement of the blocks axially toward or away from one another along the length of the shank.

2. The industrial tire chain tightener as defined by claim 1 wherein the nonextensible connector means is comprised of at least one flexible link on each block member, having one end fixed to a block member and a free end adapted to be secured to the side rail chain of an industrial tire chain.

3. The industrial tire chain tightener as defined by claim 2 further comprising shackle means removably mounted to each flexible link along the length thereof from the associated block member to the loose end for releasably affixing the link to the side rail chain of an industrial tire chain.

4. The industrial tire chain tightener as defined by claim 3 wherein two flexible links of substantially equal lengths are provided, having ends fixed to the block members on diametrically opposite sides thereof with respect to the draw bolt.

5. The industrial tire chain tightener as defined by claim 1 wherein the non-extensible connector means is comprised of two flexible links of substantially equal length attached to each of said first and second block members, the flexible links having ends fixed to the respective block members on diametrically opposite sides thereof with respect to the draw bolt.

* * * * *